United States Patent [19]

Miller

[11] 4,271,941
[45] Jun. 9, 1981

[54] RETARDER CONTROLLED OVERRUNNING CLUTCH WITH AN AXIALLY INCLINED SLOT AND PIN

[75] Inventor: Donald L. Miller, Horseheads, N.Y.

[73] Assignee: Facet Enterprises, Inc., Tulsa, Okla.

[21] Appl. No.: 16,585

[22] Filed: Mar. 1, 1979

[51] Int. Cl.³ .............................................. F16D 41/00
[52] U.S. Cl. ........................................ 192/35; 192/46
[58] Field of Search ................... 192/35, 36, 46, 67 A

[56] References Cited

U.S. PATENT DOCUMENTS

| 1,920,712 | 8/1933 | Pilcher | 192/46 X |
|---|---|---|---|
| 2,876,878 | 3/1959 | Sinclair et al. | 192/67 A |
| 2,976,974 | 3/1961 | Blyth | 192/67 A |
| 3,651,906 | 3/1972 | Slator et al. | 192/35 |
| 3,726,373 | 4/1973 | Miller | 192/35 X |

FOREIGN PATENT DOCUMENTS 180147 1/1936 Switzerland ............................. 192/46

*Primary Examiner*—Allan D. Herrmann
*Attorney, Agent, or Firm*—Remy J. VanOphem

[57] ABSTRACT

This invention is an overrunning tooth type clutch which is retarder controlled. The clutch engages and disengages two axially aligned shafts with slight relative rotation. The retarder comprises a wrap spring which is circumferentially mounted on the driven shaft and engages the driving shaft. Relative shaft rotation in one direction causes the spring to drag on the driven shaft. In this mode, a force is created in the axially inclined slot through a pin on the driving shaft which causes the driven clutch member to move axially to engage the clutch on the driving shaft. Opposite relative rotation causes the clutch teeth to separate and disengage the two clutch members for slip or overrunning.

8 Claims, 4 Drawing Figures

U.S. Patent  Jun. 9, 1981  4,271,941
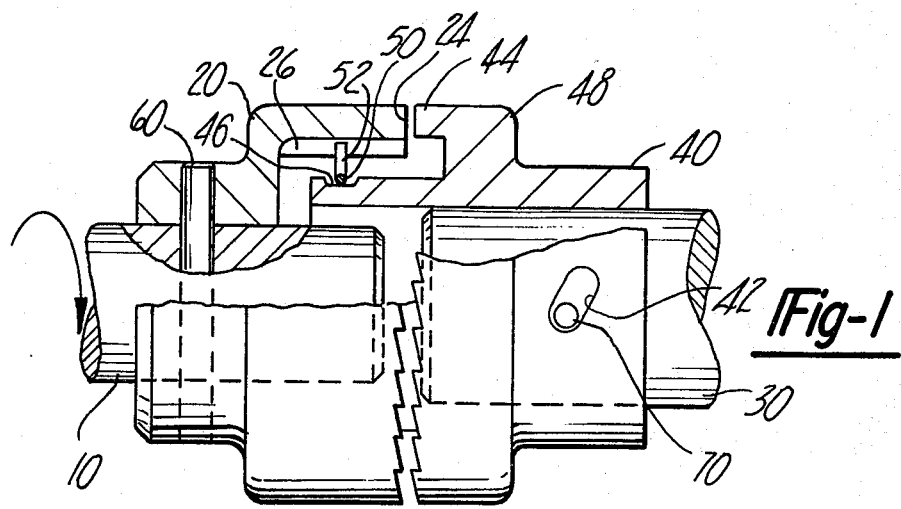
Fig-1
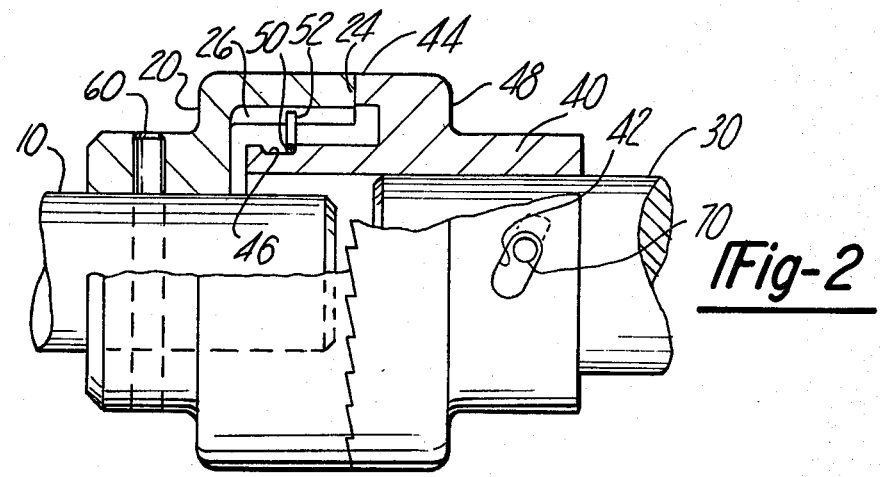
Fig-2
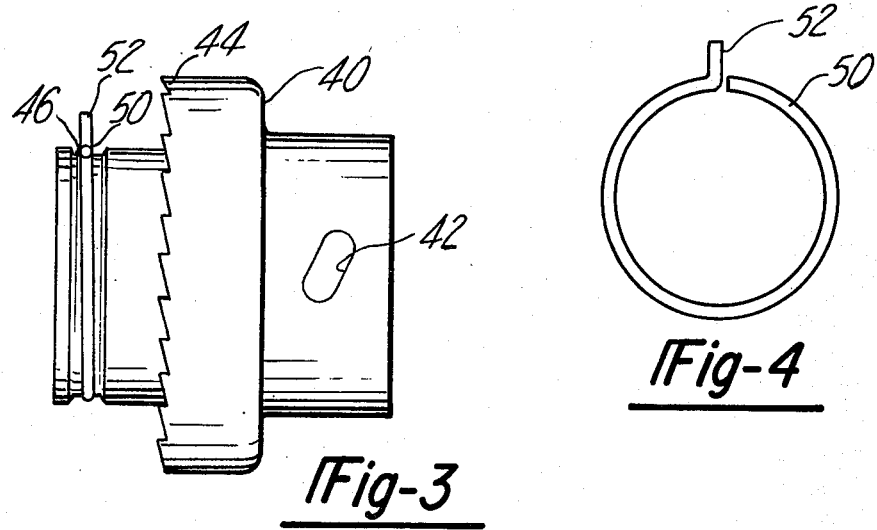
Fig-3
Fig-4

RETARDER CONTROLLED OVERRUNNING CLUTCH WITH AN AXIALLY INCLINED SLOT AND PIN

BACKGROUND OF THE INVENTION

1. Field of the Invention

The present invention relates to an automatically engaging and disengaging clutch and more particularly to a tooth type of clutch for connecting aligned shafts or the like.

2. Description of the Prior Art

Automatic engaging and disengaging overrunning clutches of the general type described herein are well known in the art. For example, in U.S. Pat. No. 2,500,132 an overrunning clutch disconnects the starting motor shaft from the engine drive pinion when the engine becomes self-operative but also acts to reestablish the driving connection to the drive pinion if the engine does not continue to run under its own power. The driving shaft is reconnected to the driven shaft by friction and camming means acting on an intermediate clutch member when the rotational speed of the driving shaft exceeds that of the driven shaft. While this design provides satisfactory control during normal use, it has been found to generate appreciable heat during long periods of overrun at high speeds, it does not reengage promptly when the driven shaft ceases to overrun the driving shaft and the design is complex and expensive to manufacture. This design was improved in U.S. Pat. No. 2,537,017 by incorporating springs and shoes which act on the intermediate clutch member. When the speed of the engine exceeds a predetermined maximum, the shoes move radially outward against the action of the springs. This permits the driven shaft to rotate freely thereby reducing the generation of heat. If the engine should not remain self-operative, the springs move the intermediate clutch with the driving shaft by camming means so that cranking if the engine can be resumed. While this design reduced the generation of heat, it was slow to reengage the driving shaft to the driven shaft, it was very complex and expensive to fabricate. A further improvement to overrunning clutches was described in U.S. Pat. No. 3,016,122. In this design, the intermediate clutch member of the previous two prior art designs was eliminated, centrifugally movable weights were incorporated to disengage the driving shaft from the driven shaft and a frictional retarder spring was added to permit the automatic reengagement of the clutch members when the driven shaft decelerates below the speed of the driving shaft. While this design was an improvement over the previous two prior art designs, it was, nevertheless complex and expensive to manufacture. Furthermore, its range of operation is defined by the centrifugal weights.

The present design is simpler than the prior art designs in that fewer parts are required to engage and disengage the clutch jaws when there is slight relative movement of the connected shafts.

SUMMARY OF THE INVENTION

In accordance with the invention, an overrunning clutch comprises a driving shaft to which is connected a cylindrical driving clutch member. The driving clutch member has first torque transmitting means on one end.

A driven shaft is mounted in axial alignment for rotation with the driving clutch member. A cylindrical driven clutch member is slidably journalled to the driven shaft. A cylindrical roller is mounted on the driven clutch member near the middle of its axial length. The collar has second torque transmitting means on one end for operatively engaging first torque transmitting means on the driving clutch member.

An axially inclined torque transmitting means is adapted to connect the driven clutch member to the driven shaft. The axially inclined torque transmitting means moves the driven clutch member into and out of engagement with the driving clutch member. Retarder means is mounted on the driven clutch member and adapted to engage the driving clutch member. Retarder means causes the driven clutch member to move axially along the driven shaft to engage the driving clutch member when the driving clutch member rotates at a relative speed faster than the driven clutch member. However, when the driven clutch member rotates at a relative speed faster than the driving clutch member, the retarder means causes the driven clutch member to move axially along the driven shaft to disengage the driving clutch member.

It is an object of the present invention to provide an overrunning clutch coupling wherein the relative shaft rotation in one direction causes a retarder means to engage the clutch members but opposite relative rotation causes the clutch members to separate at a predetermined speed for overrunning purposes and yet is simple and economical to manufacture.

It is a further object to provide an overrunning clutch coupling having retarder means and an axially inclined torque transmitting means which moves the clutch members into engagement when the relative rotational speed of the driving clutch member in one direction exceeds the rotational speed of driven clutch member. The retarder means further disengages the clutch members when the relative rotational speed of the driven clutch member and driven shaft in one direction exceeds the rotational speed of the driving shaft and further causes re-engagement of the clutch members when the driven clutch member decelerates to a rotational speed below the speed of the driving clutch member.

Further objects and advantages will be apparent from the following description taken in connection with the accompanying drawings.

BRIEF DESCRIPTION OF THE DRAWINGS

FIG. 1 is a side elevation, partly broken away and in section, showing the preferred embodiment of the invention with the clutch members in the overrunning condition or at rest.

FIG. 2 is a similar view showing the parts in the position assumed when the clutch members are in the engaged condition.

FIG. 3 is a detail view in side elevation of the driving clutch member.

FIG. 4 is a side view of a retarder spring.

DESCRIPTION OF THE PREFERRED EMBODIMENT

A driving shaft 10, as shown in FIG. 1, is mounted for rotation but prevented from axial movement, in any suitable manner (not illustrated). A generally cylindrical driving clutch member 20 is mounted coaxially with the driving shaft 10. The driving clutch member 20 is fixed to the driving shaft 10 as by fastening means such as a cross pin 60. Other suitable fastener means may be used. The driving clutch member 20 has first clutch teeth 24 formed on one end which are preferably of the "sawtooth" configuration shown. The driving clutch member 20 further has an axially extending slot 26 formed on its inner diametral surface near the end with the first clutch teeth 24.

The driven shaft 30 is mounted in axial alignment for rotation with the driving shaft 10 and the driving clutch member 20 and is axially fixed in any suitable manner (not illustrated). A generally cylindrical driven clutch member 40 is mounted coaxially with the driven shaft 30. The driven clutch member 40 is slidably journalled on the driven shaft 30 by an axially inclined radial pin 70 rigidly mounted in the driven shaft 30 and extending radially therefrom for sliding engagement with at least one slot 42 formed in the driven clutch member 40 as shown in FIG. 3. Referring again to FIG. 1, the driven clutch member 40 has a radially extending cylindrical collar 48 located at approximately its mid-length. The collar 48 is mounted, formed or attached by any suitable means to the outer cylindrical surface of the driven clutch member 40. The collar 48 has second clutch teeth 44 formed on one end adapted to engage with the first clutch teeth 24 on the driving clutch member 20. The second clutch teeth 44 are mutually engageable with the first clutch teeth 24 of the driving clutch member. The driven clutch member 40 further extends past the end of the driven shaft 30 and terminates underneath the internal slot 26 in the driving clutch member 20 as shown in FIGS. 1 and 2. As shown in FIG. 1, a recessed groove 46 is formed near the end of this extension in the driven clutch member 40 to permit mounting of a retarder means 50. The retarder means is comprised of a spring 50 which frictionally engages the driven clutch member 40 as shown in FIG. 3. The spring 50 is formed with a terminal radial projection 52 as shown in FIG. 4. The terminal radial projection 52 of the spring 50 is adapted to engage the slot 26 in the driving clutch member 20 as shown in FIGS. 1 and 2.

In the present embodiment of the invention, the spring 50 is arranged so that when the driven clutch member 40 rotates at a lower speed in the same direction as the driving clutch member 20, the frictional force between the spring 50 and the driven clutch member 40 is caused to increase as a result of the spring 50 dragging in the groove 46 of the driven clutch member 40. When on the other hand, the driven clutch member 40 overruns the driving clutch member 20 by rotating more rapidly in the same direction than the driving clutch member, the frictional force between the spring 50 and the driven clutch member 40 is decreased because of the reduced drag of the spring 50 in the groove 46 on the driven clutch member 40.

Those skilled in the art can readily appreciate that any number of springs can be used without departing from the scope of the invention. Similarly, it should be obvious to those skilled in the art that the present invention will be operative if the end of the driven clutch member 40 underneath the slot 26 of the driving clutch member 20 is smooth and does not have a groove in it as shown in this specification.

Those skilled in the art can also appreciate that assembly can be driven from either end without departing from the scope of the invention. Furthermore, it should be obvious to those skilled in the art that the present invention can also be used as a braking device.

In operation, starting with the assembly at rest in the position as illustrated in FIG. 1, rotation of the driving shaft 10, in a clockwise direction as viewed from the driving end shown by the arrow, causes the driving clutch member 20 to rotate in the same direction. Rotation of the driving clutch member 20 causes the spring 50 to frictionally engage the driven clutch member 40 by closing upon it. The spring action results in an axial force along the axially inclined slot 42 by interaction of the pin 70 which causes axial movement of the driven clutch member 40. The driven clutch member 40 continues to move axially until the first clutch teeth 24 on the driving clutch member 20 engage the second clutch teeth 44 on the driven clutch member as shown in FIG. 2. Thus, the driving shaft 10 drives the driven shaft 30.

When the driven shaft 30 overruns the driving shaft 10, the inclines on the second clutch teeth 44 on the driven clutch member 40 slip past the first clutch teeth 24 on the driving clutch member 20. In this mode, the driven clutch member rotates with the driven shaft 30 while the spring 50 is held by the radial projection 52 from rotating by the driving clutch member 20. Therefore, the frictional force between the spring 50 and the driving clutch member 20 is reduced. Reducing the frictional force that the spring exerts on the driven clutch member results in decreasing the axial force exerted by the pin 70 on the slot 42. The reduced retarding force acting through the pin 70 on the slot 42 permits the driven clutch member 40 to move axially and disengage from the driving clutch member 20 as shown in FIG. 1.

When the driven clutch member 40 decelerates to a speed slower than the rotational speed of the driving clutch member 20, the spring 50 once again begins to drag and grip the driven clutch member 40 resulting in reengagement of the clutch teeth as discussed above. Thus, the driving shaft 10 is reengaged with the driven shaft 30 as shown in FIG. 2.

What I claim is:

1. An overrunning clutch comprising:

a driving shaft;

a cylindrical driving clutch member mounted coaxially with said driving shaft, said driving clutch member further being axially fixed with respect to said driving shaft, said driving clutch member further comprising first torque transmitting means formed on one end;

a driven shaft rotatably mounted in axial alignment with said driving clutch member;

a cylindrical driven clutch member slidably journalled on said driven shaft, said driven clutch member having second torque transmitting means on a lateral face thereof;

axially inclined torque transmitting means, adapted to connect said driven clutch member to said driven shaft, said axially inclined torque transmitting means moving said second torque transmitting means on said driven clutch member into and out of engagement with said first torque transmitting means on said driving clutch member for rotating said driven and driving clutch members; and spring retarder means, mounted on said driven clutch member and adapted to engage said driving clutch member, said spring retarder means axially and rotatably moving said driven clutch member into engagement with said driving clutch member when said driving clutch member rotates at a relative speed faster than said driven clutch member, said spring retarder means further moving said driven clutch member out of engagement with said driving clutch member when said driven clutch member rotates at a relative speed faster than said driving clutch member, said spring retarder means further comprising a spring member engaging said driven clutch member and said driving clutch member.

2. An overrunning clutch as claimed in claim 1 wherein said axially inclined torque transmitting means comprises:
an axially inclined torque transmitting connection between said driven clutch member and said driven shaft operable to move said driven clutch member axially and rotatably into and out of engagement with said driving clutch member.

3. An overrunning clutch as claimed in claim 1 wherein said torque transmitting means comprises:
a clutch jaw for operatively engaging said driving clutch member to said driven clutch member.

4. An overrunning clutch comprising:
a rotatable driving shaft; a cylindrical driving clutch member mounted to said driving shaft, said driving clutch member having first torque transmitting means formed on one end, said driving clutch member further having an axially extending slot formed in the inner diametral surface thereof;
a driven shaft rotatably mounted in axial alignment with said driving clutch member;
a cylindrical driven clutch member slidably journalled on said driven shaft, said driven clutch member further having second torque transmitting means on a lateral face thereof;
an axially inclined torque transmitting connection from said driven clutch member to said driven shaft operable to move said driven clutch member into and out of engagement with said driving clutch members; and
a spring retarder connection connecting said axially extending slot of said cylindrical driving clutch member with said driven clutch member whereby when said driving clutch member rotates at a relative speed faster than said driven clutch member, the driven clutch member is caused to move into engagement with said driving clutch member and when said driven clutch member rotates at a relative speed faster than said driving clutch member, the driven clutch member is caused to move out of engagement with said driving clutch member.

5. An overrunning clutch as claimed in claim 4 wherein said first and second torque transmitting means comprises:
a clutch jaw for operatively engaging said driving clutch member to said driven clutch member.

6. An overrunning clutch comprising:
a rotatable driving shaft;
a cylindrical driving clutch member mounted to said driving shaft, said driving clutch member having first torque transmitting means formed on one end, said driving clutch member further having an axially extending slot formed in the inner diametral surface thereof;
a driven shaft rotatably mounted in axial alignment with said driving clutch member;
a cylindrical driven clutch member slidably journalled on said driven shaft, said driven clutch member further having second torque transmitting means on a lateral face thereof;
an axially inclined torque transmitting connection from said driven clutch member to said driven shaft operable to move said driven clutch member into and out of engagement with said driving clutch member, said axially inclined torque transmitting connection further comprising:
a radially extending inclined pin fixed in said driven shaft;
an axially inclined slot formed in said driven clutch member adapted to engage the projecting portion of said pin, said slot further being so inclined to the axis of said driven shaft so as to move said driven clutch member into and out of engagement with said driving clutch member; and
a frictional retarder connection adapted to connect said driven clutch member to said driven shaft whereby when said driving clutch member rotates at a relative speed faster than said driven clutch member, the driven clutch member is caused to move into engagement with said driving clutch member and when said driven clutch member rotates at a relative speed faster than said driving clutch member, the driven clutch member is caused to move out of engagement with said driving clutch member.

7. An overrunning clutch as claimed in claim 6 wherein said friction connection comprises:
a retarder spring frictionally bearing on said driven clutch member, said retarder spring further having a radial projection adapted to engage said slot in said driving clutch member.

8. An overrunning clutch comprising:
a rotatable driving shaft;
a cylindrical driving clutch member concentrically fixed on said driving shaft, said driving clutch member further being axially fixed with respect to said driving shaft, said driving clutch member further comprising:
a first clutch jaw on one end; and
an axially extending slot formed on the inner diametral surface;
a driven shaft rotatably mounted in axial alignment with said driving clutch member;
a cylindrical driven clutch member slidably journalled on said driven clutch member, said driven clutch member further comprising:
a radial groove near one end;
an axially inclined slot near the opposite end;
a radially extending cylindrical collar mounted concentrically to the outer surface of said driven clutch member near the middle along the axial length of said driven clutch member; and
a second clutch jaw on one end of said collar for operatively engaging said first clutch jaw on said driving clutch member;
a radially extending inclined pin fixed in said driven shaft, said pin further being adapted to engage said slot so as to move said driven clutch member into and out of engagement with said driving clutch member;
a retarder spring frictionally mounted in said radial groove in said driven clutch member; and
whereby when said driving clutch member rotates at a relative speed faster than said driven clutch member, the driven clutch member is caused to move into engagement with said driving clutch member and when said driven clutch member rotates at a relative speed faster than said driving clutch member, the driven clutch member is caused to move out of engagement with said driving clutch member.

* * * * *

UNITED STATES PATENT AND TRADEMARK OFFICE
CERTIFICATE OF CORRECTION

PATENT NO. : 4,271,941
DATED : June 9, 1981
INVENTOR(S) : Donald L. Miller

It is certified that error appears in the above-identified patent and that said Letters Patent is hereby corrected as shown below:

Column 5, line 35, delete "members" and insert ---- member ----.

Column 6, line 12, delete "driven shaft" and insert ---- driving clutch member ----.

Column 6, line 41, delete "clutch member" and insert ---- shaft ----.

Signed and Sealed this

Twenty-third Day of August 1983

[SEAL]

Attest:

GERALD J. MOSSINGHOFF

Attesting Officer   Commissioner of Patents and Trademarks